United States Patent
Dennis

(10) Patent No.: US 10,647,195 B2
(45) Date of Patent: May 12, 2020

(54) FILLING SYSTEM

(71) Applicant: Nissan North America, Inc., Franklin, TN (US)

(72) Inventor: Thomas Scott Dennis, Ahwatukee, AZ (US)

(73) Assignee: Nissan North America, Inc., Franklin, TN (US)

( * ) Notice: Subject to any disclaimer, the term of this patent is extended or adjusted under 35 U.S.C. 154(b) by 57 days.

(21) Appl. No.: 15/010,230

(22) Filed: Jan. 29, 2016

(65) Prior Publication Data
US 2017/0217307 A1    Aug. 3, 2017

(51) Int. Cl.
*B60K 15/04* (2006.01)
*B60K 15/03* (2006.01)
*B60K 15/05* (2006.01)

(52) U.S. Cl.
CPC .............. *B60K 15/04* (2013.01); *B60K 15/05* (2013.01); *B60K 2015/0323* (2013.01); *B60K 2015/0461* (2013.01); *B60K 2015/0483* (2013.01)

(58) Field of Classification Search
CPC ............ B60K 15/04; B60K 2015/0323; B60K 2015/0461; B60K 15/03006; B60K 2015/03019; B60K 15/05; B60K 2015/0483; B67D 7/04; B67D 7/42; B76D 4/42
USPC ...... 141/350, 348, 349, 94, 1; 220/86.2, 562; 137/599.18; 296/97.22
See application file for complete search history.

(56) References Cited

U.S. PATENT DOCUMENTS

| | | | | |
|---|---|---|---|---|
| 2,054,145 A * | 9/1936 | Tandy | ................... | B60K 15/05 280/834 |
| 2,247,509 A * | 7/1941 | Lebus | ................... | B60K 15/04 220/264 |
| 2,578,590 A * | 12/1951 | Perrault | ................... | F16K 15/03 137/493.5 |
| 3,133,741 A * | 5/1964 | Garabello | .............. | B60K 15/05 220/86.2 |
| 3,159,409 A * | 12/1964 | Koehler | ................. | B60K 15/04 141/115 |
| 4,056,234 A * | 11/1977 | Carre | ..................... | B65G 47/19 141/392 |
| 4,127,142 A * | 11/1978 | Snider | ...................... | E03B 9/04 137/285 |
| 4,469,149 A * | 9/1984 | Walkey | .................... | B67D 7/14 141/346 |
| 4,596,263 A * | 6/1986 | Snider | ...................... | E03B 9/04 137/493.3 |
| 5,072,986 A * | 12/1991 | Tai | ........................ | B60K 15/05 220/86.2 |
| 5,090,760 A * | 2/1992 | Wheeler | ................ | B60K 15/04 220/86.1 |
| 5,163,473 A * | 11/1992 | Strnad, Jr. | ............. | B60K 15/04 137/588 |

(Continued)

*Primary Examiner* — Timothy L Maust
*Assistant Examiner* — James R Hakomaki
(74) *Attorney, Agent, or Firm* — Global IP Counselors, LLP

(57) ABSTRACT

A filling system includes a pipe, a restricting member, a detector, and an actuator. The restricting member is disposed in the pipe to restrict insertion of an object into the pipe. The detector is configured to detect the presence of a metal nozzle in the pipe. The actuator is configured to move the restricting member to enable access through the pipe.

19 Claims, 5 Drawing Sheets

(56) References Cited

U.S. PATENT DOCUMENTS

| | | | | |
|---|---|---|---|---|
| 5,249,612 | A * | 10/1993 | Parks | B67D 7/348 141/219 |
| 5,485,871 | A * | 1/1996 | Romanek | B60K 15/04 141/312 |
| 5,571,249 | A * | 11/1996 | Boylen | B60K 15/04 137/314 |
| 5,791,387 | A * | 8/1998 | Palvolgyi | B60K 15/05 141/301 |
| 5,923,572 | A * | 7/1999 | Pollock | B67D 7/222 141/94 |
| 5,988,238 | A * | 11/1999 | Palvolgyi | B60K 15/05 141/312 |
| 6,070,156 | A * | 5/2000 | Hartsell, Jr. | B67D 7/067 705/413 |
| 6,149,033 | A * | 11/2000 | Poleshuk | B67D 7/12 222/75 |
| 6,318,771 | B1 * | 11/2001 | Holloway | B60K 15/05 292/201 |
| 6,446,826 | B1 * | 9/2002 | Foltz | B60K 15/04 220/203.01 |
| 6,712,102 | B2 * | 3/2004 | Zerangue, Sr. | B60K 15/04 141/1 |
| 6,739,633 | B2 * | 5/2004 | Holloway | E05B 83/34 292/144 |
| 6,929,238 | B2 * | 8/2005 | Bartell, Jr. | F16K 15/063 251/129.03 |
| 8,215,333 | B2 * | 7/2012 | Stokes | B60K 15/04 137/312 |
| 8,662,235 | B2 * | 3/2014 | McNicholas | F17C 13/02 180/271 |
| 8,905,458 | B2 * | 12/2014 | Pipp | B60K 15/05 141/348 |
| 9,650,235 | B2 * | 5/2017 | Braden | B67D 7/34 |
| 2002/0020465 | A1 * | 2/2002 | Gzik | B60K 15/04 141/390 |
| 2003/0221675 | A1 * | 12/2003 | Washeleski | B60K 15/03504 123/497 |
| 2004/0221920 | A1 * | 11/2004 | Ferguson | B67D 7/3236 141/392 |
| 2005/0000588 | A1 * | 1/2005 | Webb | B67D 7/04 141/94 |
| 2005/0217751 | A1 * | 10/2005 | Valentine | B60K 15/04 141/104 |
| 2006/0011164 | A1 * | 1/2006 | Kropinski | F02D 41/042 123/198 D |
| 2008/0236685 | A1 * | 10/2008 | Nourdine | B60K 15/04 137/599.18 |
| 2009/0056829 | A1 * | 3/2009 | Aitken | B60K 15/04 141/348 |
| 2009/0303466 | A1 * | 12/2009 | Arakawa | F02D 19/0628 356/128 |
| 2010/0313969 | A1 * | 12/2010 | Stokes | B60K 15/04 137/312 |
| 2012/0305127 | A1 * | 12/2012 | Roys | B67D 7/344 141/1 |
| 2014/0061192 | A1 * | 3/2014 | Aitken | B60K 15/05 220/86.2 |
| 2014/0091095 | A1 * | 4/2014 | Hagano | B60K 15/05 220/562 |
| 2016/0023886 | A1 * | 1/2016 | Braden | B67D 7/34 141/94 |

* cited by examiner

FILLING SYSTEM

BACKGROUND

Field of the Invention

The present invention generally relates to a filling system. More specifically, the present invention relates to a Diesel tank filling system for a vehicle that prevents an undesired object from being inserted into the filling system.

Background Information

It has been found that adding Diesel Exhaust Fluid (DEF) to the exhaust of Diesel engines reduces reduce emissions. DEF is a non-hazardous solution, and is generally 32.5% urea and 67.5% de-ionized water. DEF is sprayed into the exhaust stream of Diesel vehicles to break down dangerous NOx emissions into harmless nitrogen and water. Engine systems that employ the addition of DEF use a Selective Catalytic Reduction (SCR) to spray DEF into the exhaust stream. DEF is not a fuel additive and should not come into contact with Diesel fuel. It is stored in a separate tank, typically indicated with a blue filler cap.

SUMMARY

It has been discovered when DEF contacts Diesel fuel or is introduced into the Diesel fuel system, DEF can be extremely aggressive and will immediately crystalize. Even limited amounts of DEF can destroy the fuel system integrity and compromise major engine components.

In view of the state of the known technology, one aspect of the present disclosure is to provide a filling system including a pipe, a restricting member, a detector, and an actuator. The restricting member is disposed in the pipe to restrict insertion of an object into the pipe. The detector is configured to detect the presence of a metal nozzle in the pipe. The actuator is configured to move the restricting member to enable access through the pipe.

Another aspect of the present disclosure is to provide a method of passing a liquid through a pipe, the method including detecting the presence of a metal nozzle in the pipe, actuating a restricting member to enable access through the pipe while detecting the presence of the metal nozzle in the pipe, and dispensing a liquid through the pipe.

BRIEF DESCRIPTION OF THE DRAWINGS

Referring now to the attached drawings which form a part of this original disclosure.

DETAILED DESCRIPTION OF EMBODIMENTS

Figure 1:
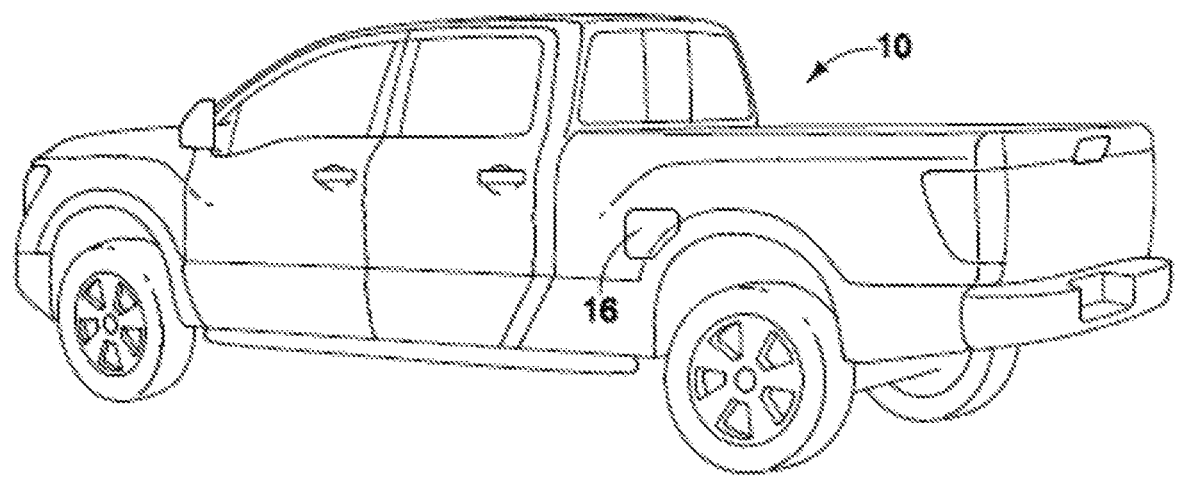
FIG. 1 is a rear perspective view of a vehicle including a filling system according to one embodiment.
Figure 2:
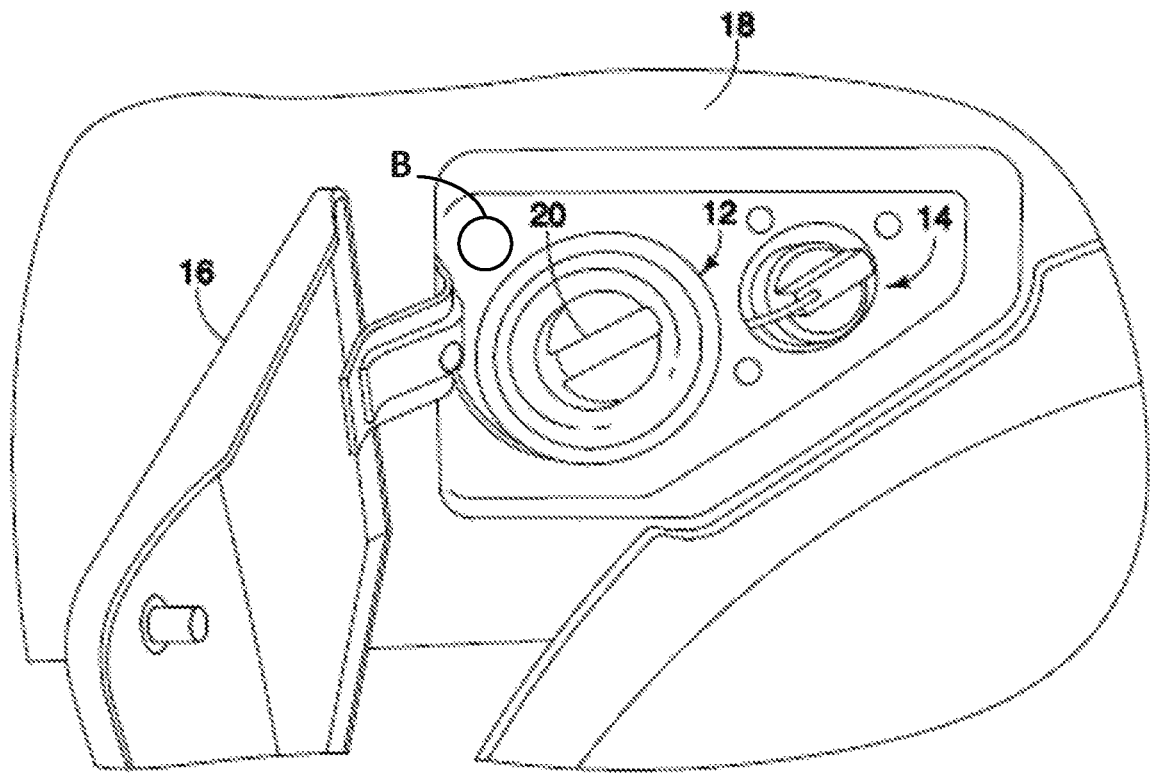
FIG. 2 is an enlarged view of the cap for the filling system of one embodiment for the present invention and a cap for the DEF filling system.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 is illustrated that includes a filling system (e.g., fuel filling system) 12 in accordance with an embodiment and a DEF filling system 14. The filling system 12 is accessed through a door 16 in a portion of the vehicle 10. Additionally, the access to the filling system 12 is recessed in the portion 18 of the vehicle, such that when the door 16 is closed, the door 16 and the exterior of the vehicle 10 provide a smooth aesthetically pleasing appearance.

The filling system 12 is preferably a Diesel fuel filling system and can include a cap 20, a pipe 22, a fuel tank 24, and restricting device 26. The restricting device 26 can include a detector 28, a restricting member 30, a controller 32, an actuator 34, and a display device 35. The filling system 12 enables Diesel fuel D to pass through the pipe 22 and fill the fuel tank 24 and prevents and undesired object 36 (e.g., a DEF filling device) from entering and dispending DEF into the filling system 12.

It has been found that since the DEF filling system 14 is adjacent the fuel filling system 12 it is possible for DEF to be inadvertently added to the fuel filling system 12. When DEF is added to the fuel filling system 12, the DEF will crystalize the fuel D (Diesel fuel), destroying the fuel system integrity and compromising major engine components. The filling system 12 according to one embodiment, detects the presence of a metal nozzle 38 in the pipe 22 to move the restricting member 30 into an open position and enable fuel D to be added to the fuel tank 24. On the other hand, when an undesired object 36 (e.g., a plastic filler nozzle for DEF filling system) is inserted into the pipe 22, the detector 28 does not detect metal and the restricting member 30 maintains a closed position, preventing the addition of DEF to the fuel tank 24.

Turning to FIGS. 3-6, a filling system 12 according to one embodiment is illustrated. The controller 32 or control unit of the filling system 12 preferably includes a microcomputer with a control program that controls the actuator 34 as discussed below. The controller 32 can also include other conventional components such as an input interface circuit, an output interface circuit, and storage devices such as a ROM (Read Only Memory) device and a RAM (Random Access Memory) device. The microcomputer of the controller 32 is programmed to control the actuator 34, receive signals from and operate the detector 28, and display information on the display device 35. A memory circuit stores processing results and control programs such as ones for actuator operation, the detector 28 and the display device 35 that are run by a processor circuit. The controller 32 is operatively coupled to the actuator 34, the detector 28 and the display device 35 in a conventional manner. It will be apparent to those skilled in the art from this disclosure that the precise structure and algorithms for the controller 32 can be any combination of hardware and software that will carry out the functions of the present invention.

Figure 4:
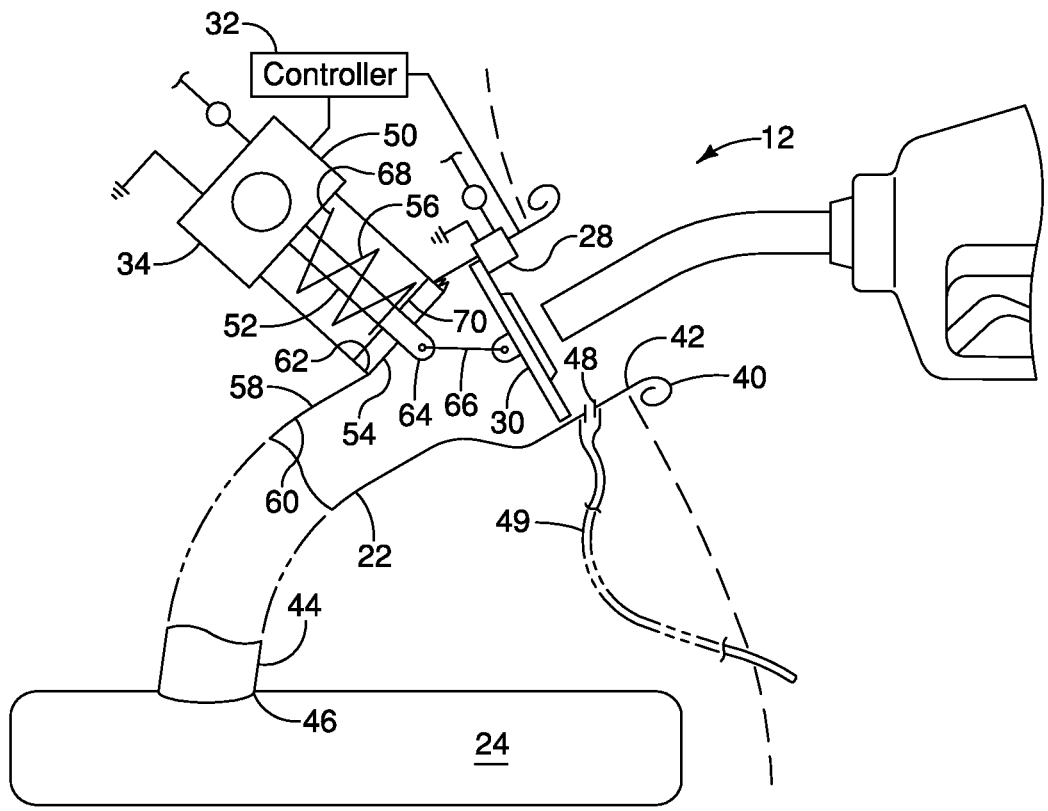
FIG. 4 is a sectional view of the filling system for the vehicle illustrated in FIG. 1 with a fuel nozzle partially inserted therein.
Figure 5:
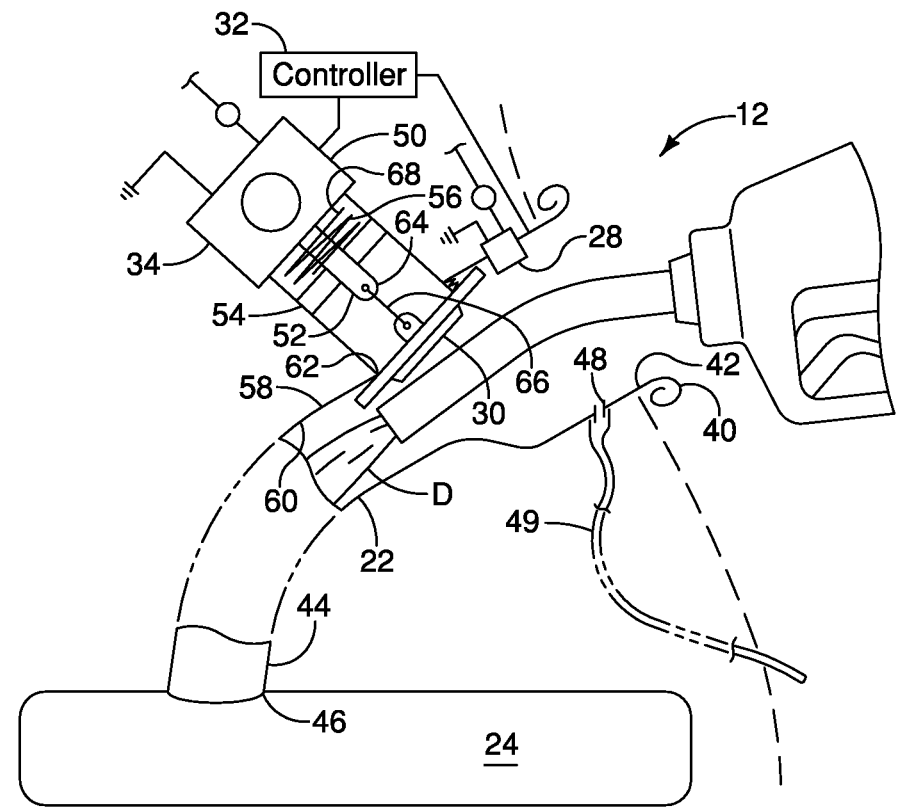
FIG. 5 is a sectional view of the filling system shown in FIG. 3 with the restricting member in an open position to enable insertion of the fuel nozzle.
Figure 6:
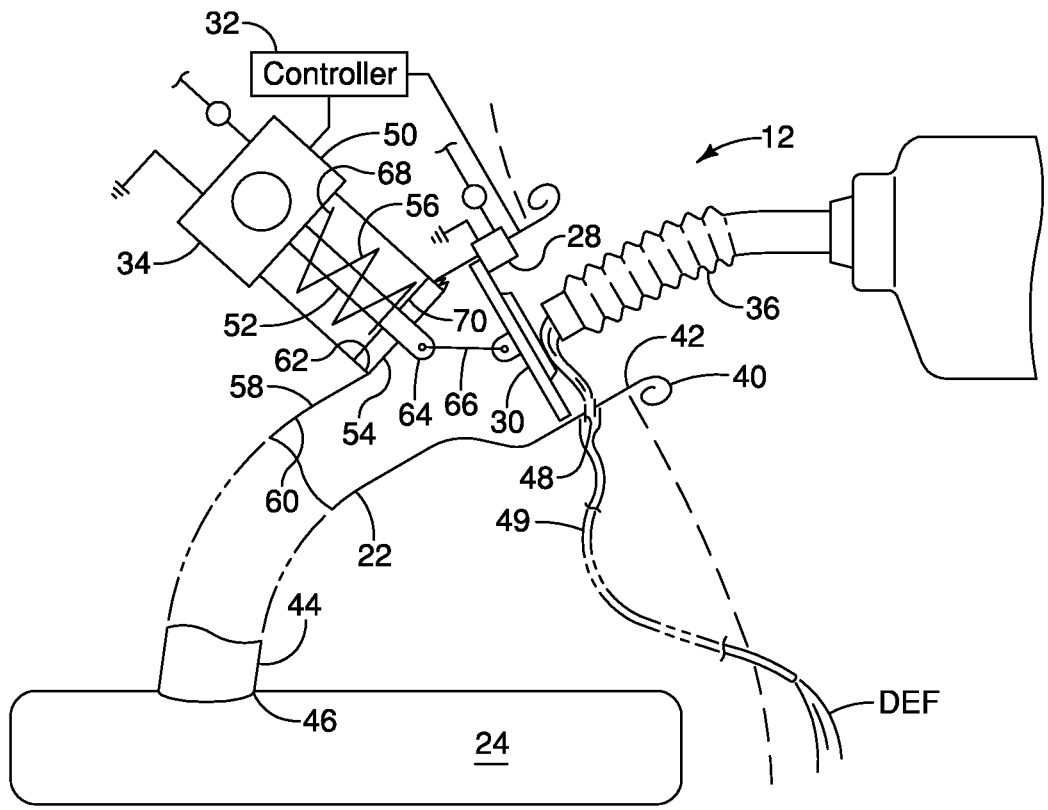
FIG. 6 is a sectional view of the filling system shown in FIG. 3 with the restricting member in a closed position to restrict insertion of an undesired object.

As shown in FIGS. 4-6, the pipe 22 is preferably a metal fuel filling pipe that extends from a first end 40 having a first opening 42 to a second end 44 having a second opening 46. The first opening 42 opens at the portion of the vehicle to allow access through the pipe 22 and the second opening 46 is connected to the tank 24. The pipe 22 enables Diesel fuel D (or any other desired liquid) to be inserted into the first end 40 of the pipe 22 and fill the tank 24. The pipe 22 also includes a drain opening 48 in a portion thereof. Preferably, the drain opening 48 is disposed upstream of the restricting member 30 and is configured to enable undesired fluid to pass there through and into a passage 49 to the exterior of the vehicle (FIG. 6). The drain opening 48 and the passage 49 together are a drain that enables fluid to pass there through and drain from the vehicle 10. Moreover, in this embodiment, when a metallic fuel nozzle 38 is properly interested into the pipe 22, the end of the fuel nozzle 38 is inserted farther into the pipe 22 than the position of the drain opening 48. Thus, the drain opening 48 is positioned and arranged to enable proper filling of the tank 24 with the desired fuel, while also preventing undesired fluid from entering the fuel tank 24.

The fuel tank 24 is any suitable metal tank that is capable of holding Diesel or any other suitable liquid. The fuel tank 24 can have an opening at a top end thereof. As is understood, the pipe 22 is connected to the fuel tank 24 in any suitable manner that enables liquid to pass through the pipe 22 and into the tank 24 through the opening in the tank 24.

The detector 28 is a sensor that is configured to sense metal, such as aluminum or any other suitable metal. The detector 28 is in communication with the controller 32, such that when the detector 28 detects a predetermined material, such as metal or aluminum, this information is communicated to the controller 32. In one embodiment, the detector 28 is an inductive proximity sensor that is capable of non-contact detection of metallic objects. Such a sensor includes a coil and an oscillator that creates an electromagnetic field in close surroundings of the sensing surface. Thus, the presence of a metallic object in the operating area causes a dampening of the oscillation amplitude. The rise and fall of such oscillation is identified by a threshold circuit that changes the output of the sensor. The detector can be any suitable detector capable of detecting any suitable material.

As a sensor, the detector 28 can include an output amplifier with either a normally closed or a normally open function that can pilot the load in series. Accordingly, a residual current flows through the load even when in the open state and a voltage drop occurs in the sensor when it is in a closed state.

The actuator 34 includes a housing 50 for an actuation motor (not shown), an actuation arm 52, a biasing (or nozzle) plate 54 connected to the actuation arm 52 and a spring or biasing member 56 encompassing the actuation arm 52. The housing 50 is coupled or attached to the exterior 58 of the pipe 22 and is arranged to access the interior of pipe 22 through the interior surface 60 of the pipe 22 through an opening 62. The actuator 34 is also disposed to enable positioning of the restricting member 30 downstream of the drain opening 48. The actuation arm 52 is connected, at a first end to the actuation motor and at a second end 64 to the restricting member 30 via a connecting member 66 so as to actuate the restricting member 30 between a closed state (FIG. 4) and an open state (FIG. 5). The spring 56 encompasses the actuation arm 52 and generally biases the restricting member 30 so as to be in the closed state. In other words, a first end 68 of the spring 56 is adjacent to or in contact with the housing 50 and a second end 70 of the spring 56 is adjacent to or in contact with the biasing plate 54. The spring 56 is configured to bias the biasing plate 54 and thus the restricting member 30 outwardly and into the closed position.

Figure 7:
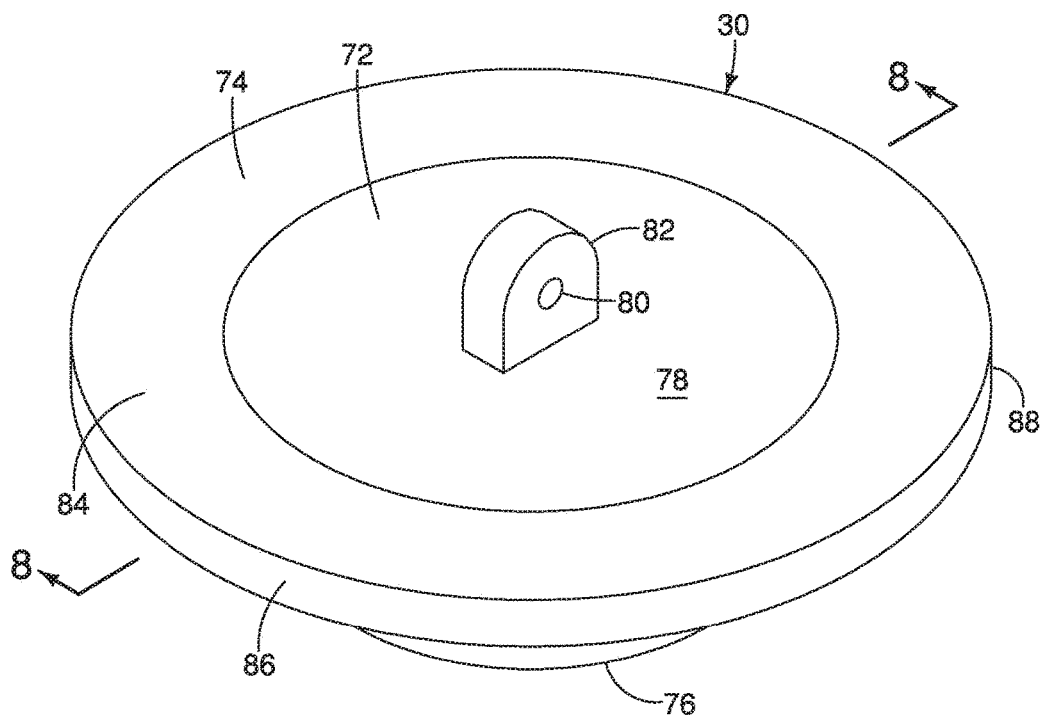
FIG. 7 is a top perspective view of the restricting member shown in FIG. 3.
Figure 8:
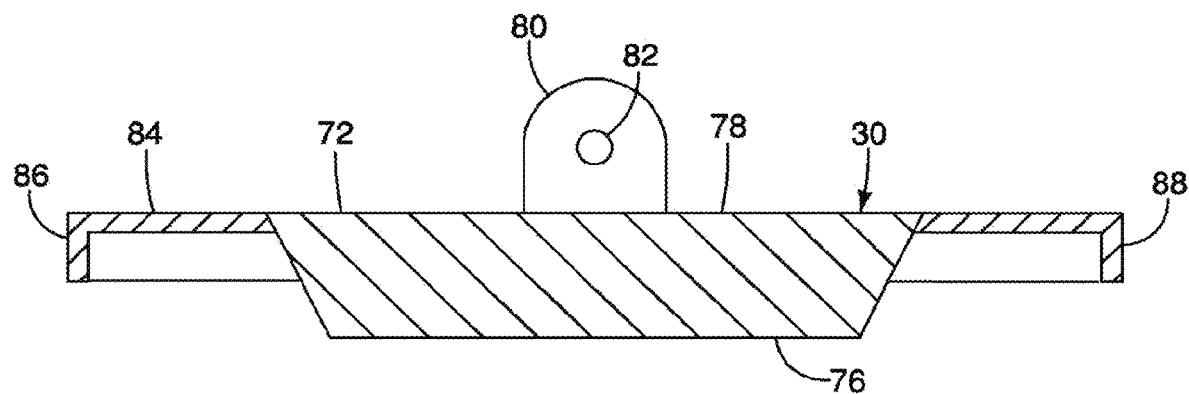
FIG. 8 is a side cross sectional view of the restricting member taken along lines 7-7 in FIG. 7.

As shown in FIGS. 7 and 8, the restricting member 30 is preferably a valve that can include a generally circular central portion 72 with a generally circular extension 74 surrounding the generally circular portion 72. The central portion 72 has a first surface 76 and a second surface 78. The first surface 76 is generally flat and is configured to be arranged in the pipe 22 so as to face in a direction towards the first opening 42. The second surface 78 has a protrusion 80 with opening 82 and connects to the connecting member 66 of the actuator 34.

The extension 74 has a first portion 84 that extends generally transverse or perpendicular to the longitudinal direction of the pipe 22 and a second portion 86 that extends generally perpendicular to the first portion 84, and thus generally parallel to the longitudinal direction of the pipe 22. The second portion 86 extends in a direction toward the first opening 42. The second portion 86 is sized and configured such that the outer peripheral edge 88 has basically the same diameter as the interior surface 60 of the pipe 22. Thus, as can be understood, the restricting member 30 is circular and has a circumferential periphery, and the second portion 86 (e.g., a protrusion) extends from the circumferential periphery of the restricting member 30 and in a direction towards an opening 42 in the pipe 22. Accordingly, the restricting member 30 prevents all or substantially all of a fluid from passing through the pipe 22 when in a closed state. Moreover, the restricting member 30 is configured to prevent an undesired solid object (e.g., undesired object 36) from being fully inserted into the pipe 22. For example, if a nonmetallic nozzle is inserted through the first opening 42, preferably the nonmetallic nozzle will contact the restricting member 30 and prevent further insertion into the pipe 22.

It is noted that the restricting member 30 can be any suitable restricting member 30 that is configured to be arranged in the pipe 22 and prevent undesired objects or fluid from passing through the pipe 22, and is not limited to the specific configuration described herein.

Figure 9:
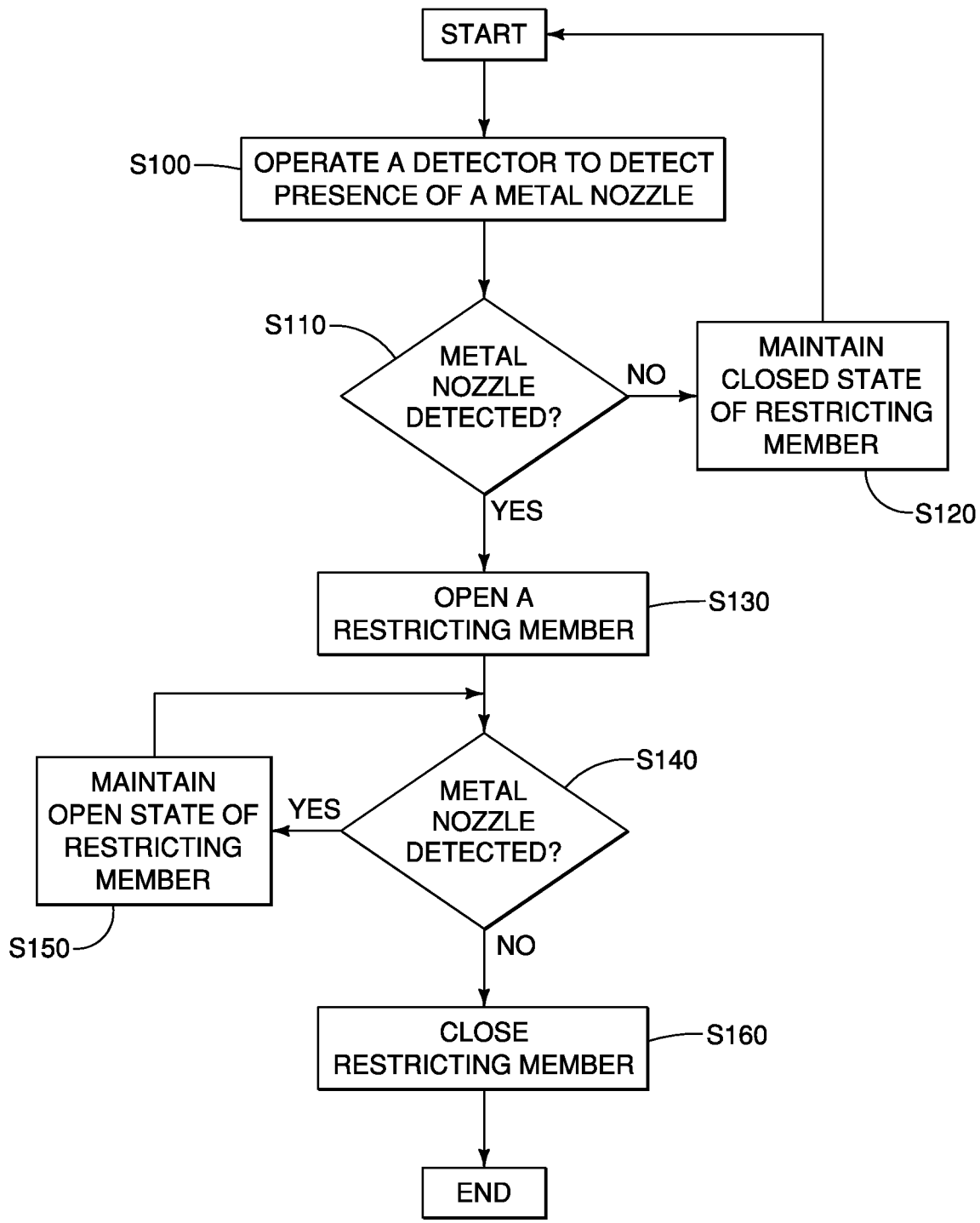
FIG. 9 is a flow chart illustrating the procedure for determining whether to position the restricting member in the open position or the closed position.

Turning to FIG. 9, the process of determining whether the restricting member 30 should be in the closed or open state is illustrated. Under a generally nonoperational state, the restricting member 30 is in a closed state. Thus, the process generally begins with the restricting member 30 in a closed state. In step S100, the detector 28 is operated to detect whether metal is present in the pipe 22. The detector 28 can be continually operational or the detector 28 can be become operation upon the removal of the fuel cap 20 or in any other suitable manner. In step S110 a determination is made by the controller 32, or in any other suitable manner, whether metal has been detected. If no metal is detected, the controller 32 performs no operation and the restricting member 30 maintains a closed position, as shown in step S120. Accordingly, if an undesired object 36 (for example, a plastic nozzle from a DEF container, or in the case where DEF is obtained from a commercial dispenser pump, the station operator may elect to replace the dispenser tube with a composite, HDPE, or other non-metallic material to ensure their customer's correct application) is inserted into the pipe 22 the restricting member 30 maintains the closed position. In this situation, if DEF is inserted into the pipe 22, the restricting member 30 will prevent the DEF from passing through the pipe 22 and into the tank 24. The DEF will exit the pipe 22 through the drain opening 48 in the pipe 22 and exit the pipe 22 through the passage 49.

The system then proceeds to recheck for metal. If metal has been detected (e.g., the presence of a Diesel fueling nozzle 38), the controller 32 instructs the actuation device to operate and open the restricting member 30 in step S130. In other words, the actuation motor is operated causing the actuation arm 52 to retract against the biasing force of the spring 56. This operation pivots the restricting member 30 around the pivot point, moving the restricting member 30 into the open state.

Accordingly, when the restricting member 30 is in the open state, a device, such as a Diesel fuel filling nozzle 38 can be fully inserted into the pipe 22. Diesel fuel D can then be safely dispensed into the tank 24 through the pipe 22.

The detector 28 continues to operate to detect metal. If metal is detected in step S140, the controller 32 maintains the restricting member 30 in the open state in step S150, enabling continual fueling. If metal is no longer detected (e.g., the Diesel fueling nozzle 38 has been removed), the controller 32 instructs the actuation member to actuate and return the restricting member 30 to the closed state in S160.

Figure 3:
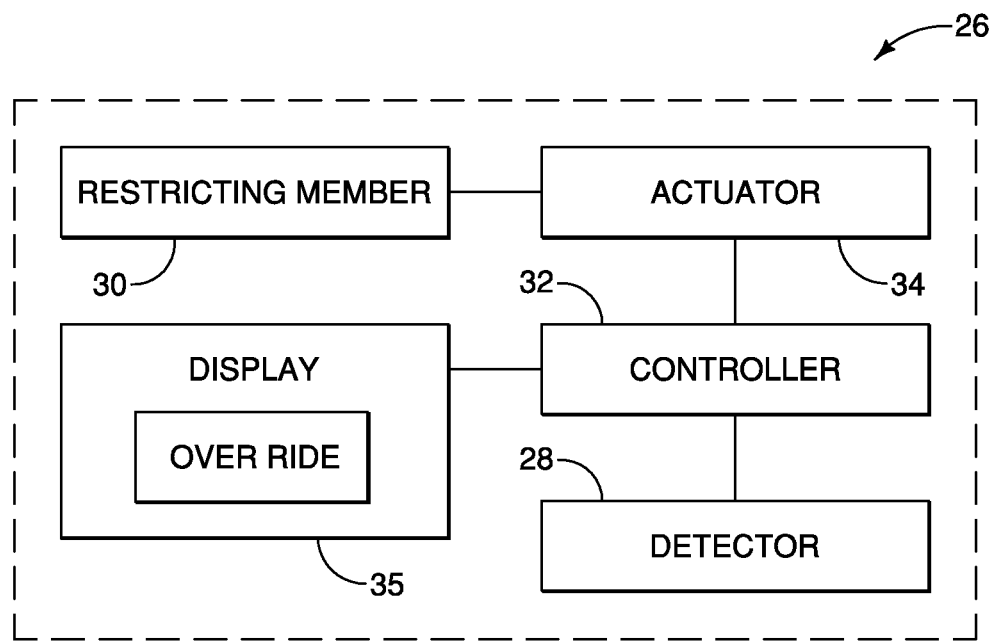
FIG. 3 is a schematic view of the fuel system illustrated in FIG. 3.

Additionally, as shown in FIG. 3 the controller 32 can be connected to a display device 35 that enables the vehicle user to manually override the detector 28 (using the override) and open the restricting member 30. Such a situation may arise if the vehicle is being fueled using a plastic filling can or some other nonmetallic nozzle. Accordingly, in this situation, the user can manually provide instructions through a user interface to the controller 32 to operate the restricting member 30 to move the restricting member 30 to the open position. The display device 35 can be disposed in the recessed portion adjacent the filling system or in the interior of the vehicle or in any suitable position.

In another embodiment, the override can be a manual latch or mechanism to move the restricting member 30 into the open position. Such a mechanism would preferably enable the restricting member 30 to be moved even in situations in which the vehicle had no electrical power or in which electrical power is not desired to be used. In this embodiment, the override can be a button B or lever disposed in the recessed portion adjacent the filling system or in the interior of the vehicle or in any suitable position. It is noted that the override can be any suitable mechanical or electrical device that would enable the user to move the restricting member 30 from the closed position to the open position, thus allowing any type of filling device to be inserted into the pip and fill the fuel tank 24.

The actuator 34, tank 24 and pipe 22 are conventional components that are well known in the art. Since the actuator 34, tank 24 and pipe 22 are well known in the art, these structures will not be further discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," "member" or "element" when used in the singular can have the dual meaning of a single part or a plurality of parts. Also as used herein to describe the above embodiment(s), the following directional terms "rear", "down", "vertical", and "below", as well as any other similar directional terms refer to those directions of a vehicle equipped with the filling system 12. Accordingly, these terms, as utilized to describe the present invention should be interpreted relative to a vehicle equipped with the filling system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A filling system comprising:
   a pipe having a longitudinal direction and an external opening configured to receive a metal fuel nozzle;
   a restricting member disposed in the pipe to restrict insertion of an object into the pipe, the restricting member having a circumferential periphery, a surface extending transverse to the longitudinal direction of the pipe and a protrusion extending from the surface and around the circumferential periphery in a direction towards the external opening in the pipe;
   an electronic detector configured to detect the presence of the metal fuel nozzle in the pipe;
   an actuator configured to move the restricting member to enable access through the pipe; and
   a drain disposed in the pipe, the drain being disposed such that when the metal fuel nozzle is inserted into the pipe and the restricting member enables access through the pipe, a distal end of the fuel nozzle is positioned farther from the external opening than the drain.

2. The filling system according to claim 1, wherein the electronic detector is a sensor configured to detect the presence of aluminum.

3. The filling system according to claim 1, wherein the electronic detector is in communication with the actuator to automatically move the actuator when metal is detected.

4. A filling system comprising:
a pipe;
a restricting member disposed in the pipe to restrict insertion of an object into the pipe;
an electronic detector configured to detect the presence of a metal nozzle in the pipe;
an actuator configured to move the restricting member to enable access through the pipe; and
a drain disposed in an interior surface of the pipe, the drain being disposed such that when the metal fuel nozzle is inserted into the pipe and the restricting member enables access through the pipe, a distal end of the fuel nozzle is positioned farther from the external opening than the drain.

5. The filling system according to claim 4, wherein the drain is disposed to drain liquid from the pipe when the restricting member restricts insertion of an object into the pipe.

6. The filling system according to claim 4, wherein the drain is disposed upstream of the restricting member.

7. The filling system according to claim 1, wherein the pipe is in fluid communication with a fuel tank.

8. The filling system according to claim 1, wherein the restricting member includes a valve to prohibit insertion of the object into the pipe.

9. The filling system according to claim 8, wherein the restricting member includes a nozzle plate coupled to the valve.

10. The filling system according to claim 1, further comprising
an electronic controller programmed to automatically control the actuator.

11. A method of passing a liquid through a pipe with a drain and an external opening configured to receive a metal fuel nozzle, the method comprising:
detecting, with an electronic detector, a presence of the metal fuel nozzle in the pipe;
actuating a restricting member having a protrusion, the actuating of the restricting member enabling access through the pipe while detecting the presence of the metal fuel nozzle in the pipe, such that a distal end of the metal fuel nozzle is positioned farther from the external opening than the drain the protrusion extending around a circumferential periphery of the restricting member in a direction towards the external opening in the pipe,
preventing actuation of the restricting member without detecting the presence of the metal fuel nozzle in the pipe such that the restricting member is in a closed position causing the protrusion to substantially maintain a position adjacent an interior of the pipe; and
dispensing the liquid through the pipe while detecting the presence of the metal fuel nozzle in the pipe.

12. The method according to claim 11, wherein the detecting includes using a sensor to detect the presence of aluminum.

13. The method according to claim 11, further comprising communicating the presence of the metal fuel nozzle detected by the electronic detector to an actuator to automatically move the actuator.

14. The method according to claim 11, further comprising draining a second liquid from the pipe through the drain in an interior surface of the pipe while the presence of the metal fuel nozzle is not detected in the pipe.

15. The method according to claim 14, wherein the drain is disposed upstream of the restricting member.

16. The method according to claim 11, wherein the dispensing the liquid through the pipe includes dispensing the liquid through the pipe and into a fuel tank.

17. The method according to claim 11, wherein the actuating is controlled by an electronic controller.

18. The filling system according to claim 1, further comprising
an actuator having a first end and a second end, the second end being connected to the restricting member.

19. The filling system according to claim 1, further comprising
a manual override configured to manually override the electronic detector.

* * * * *